No. 729,654. PATENTED JUNE 2, 1903.
J. L. PARKER.
POWER PLOW.
APPLICATION FILED SEPT. 22, 1902.
NO MODEL.
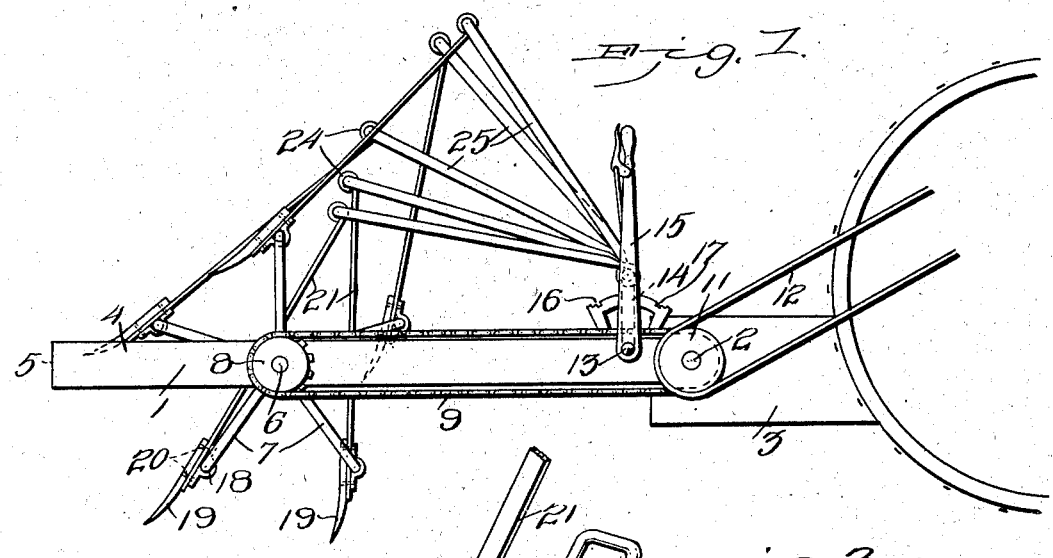
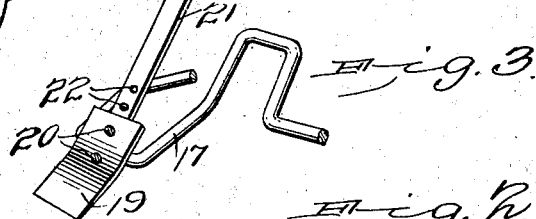
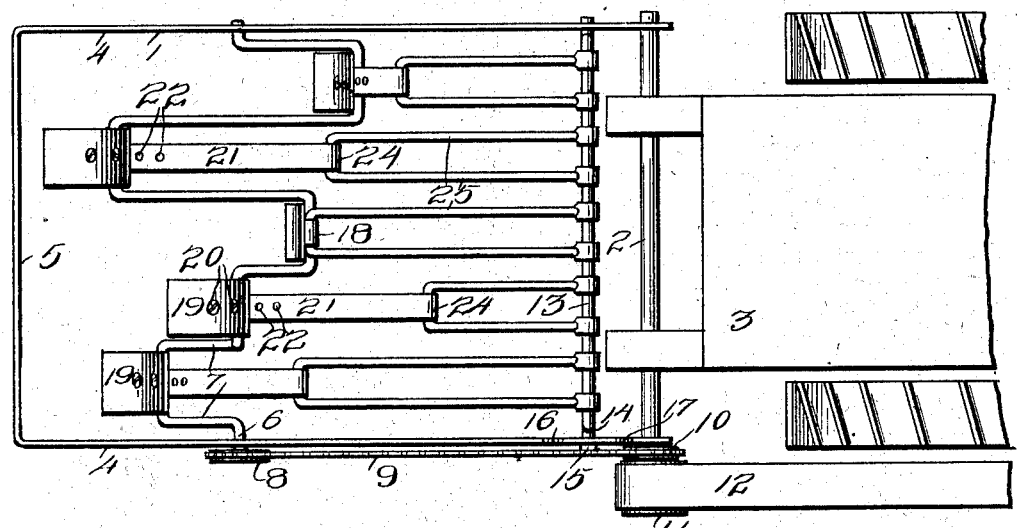
Witnesses
John L. Parker, Inventor.
by
Attorneys No. 729,654. Patented June 2, 1903.

UNITED STATES PATENT OFFICE.

JOHN L. PARKER, OF AUBREY, TEXAS.

POWER-PLOW.

SPECIFICATION forming part of Letters Patent No. 729,654, dated June 2, 1903.

Application filed September 22, 1902. Serial No. 124,473. (No model.)

*To all whom it may concern:*

Be it known that I, JOHN L. PARKER, a citizen of the United States, residing at Aubrey, in the county of Denton and State of Texas, have invented a new and useful Power-Plow, of which the following is a specification.

This invention relates to plows operated by power, such as traction-engines, with which such plows may be readily connected, and which are usually so constructed as to conveniently transmit motion to the operating mechanism of the plow.

Specifically, the invention relates to that class of plows sometimes denominated "diggers," in which a plurality of spades or spading implements have suitable connection with cranks upon a shaft, the rotation of which bring the said spading implements successively into engagement with the ground, thereby raking the soil and preparing it for planting.

My present invention has for its object to provide a plow of this class which shall possess superior advantages in point of simplicity, durability, and general efficiency; and with these ends in view the invention consists in the improved construction, arrangement, and combination of parts, which will be hereinafter fully described, and particularly pointed out in the claims.

In the accompanying drawings, Figure 1 is a side elevation illustrating a plow constructed in accordance with the principles of my invention. Fig. 2 is a top plan view of the same. Fig. 3 is a perspective detail view of a portion of the crank-shaft with one of the spading implements connected therewith.

Corresponding parts in the several figures are indicated by similar characters of reference.

1 designates the plow-frame, which is connected by means of a shaft 2 with the tail end of the frame 3 of a traction-engine, which may be of any suitable construction, and which does not form a part of my invention. In place of a traction-engine it may be stated that any other suitable power may be employed.

The frame 1, which is mainly composed of side pieces 4 4 and a rear piece 5, may be described as mounted pivotally upon the shaft 2. The sides of said frame are provided with bearings for a crank-shaft 6, provided between the sides 4 4 of the frame with a plurality of cranks 7, radiating in different directions from the axis of said shaft, the construction which I prefer being to dispose the said cranks spirally with relation to the axis of the shaft. The crank-shaft 6 is provided at one end thereof with a sprocket-wheel 8, connected by means of a chain 9 with a sprocket-wheel 10 upon the main connecting-shaft 2. The latter also carries a pulley 11, connected by a bolt or band 12 with the source of power, which is in this instance supposed to be the fly-wheel of the traction-engine with which my improved power-plow is connected.

The sides of the frame 1 are provided a short distance in rear of the connecting-shaft 2 with a transverse shaft 13, which is bent between the sides of the frame so as to form thereon a single crank 14. One end of the shaft 13 carries an adjusting-lever 15, having a suitably-operated dog or pawl adapted to engage the notches 16 in a segment-rack 17, whereby the said lever and the crank-shaft controlled thereby may be retained securely in any position to which they may be adjusted.

Upon the cranks 7 of the main crank-shaft 6 are mounted bearing-boxes 18, with the faces of which the spading elements 19 have adjustable connection by means of bolts 20 or other suitable connecting means. The said spading elements are provided with handles 21, which may be perforated, as shown at 22, in order to enable any desired adjustment to be effected with relation to the boxes engaging the cranks, thereby regulating the extent to which the spading elements which constitute the plows shall be permitted to enter into the ground. The upper ends of the handles 21 have pivotal connection by means of boxes 24 with the outer ends of stirrups 25, the arms of which are pivotally mounted at their inner ends upon the crank 14 of the shaft 13 between the sides of the frame.

The operation of this invention will be readily understood from the foregoing description, taken in connection with the drawings hereto annexed.

When the device is in operation and the engine with which it is connected travels over the ground, a rotary motion is transmitted by the belt 11 to the shaft 2 and from thence to the crank-shaft 6. When the latter revolves, the spading implements will receive, through the medium of the cranks, not only a vertically-reciprocating but also a longitudinally-vibratory movement, owing to the connection of the upper ends of the handles with the stirrups 25. It will be seen that when the plows or spades engage the ground and their lower ends are tilted or forced in a rearward direction the effect is not merely to stir and to pulverize the soil, but the resisting action of the latter will have the effect of impelling the engine from which the power is derived in a forward direction, thus gaining an increase of power by neutralizing the power expended and utilizing any excess of power by impelling the machine forwardly. This is an important feature of my invention, inasmuch as by this arrangement waste of power is absolutely and totally avoided. By adjusting the crank-shaft 13 by means of the lever 15 the tilt of the spading implements may be adjusted so as to cause the latter to enter the ground practically at right angles or at any desired inclination which may be deemed suitable to obtain the most desirable effects upon the soil that is being operated upon.

I desire it to be understood that while I have described and illustrated a preferred form I do not limit myself to the details of construction herein set forth, but reserve the right to any changes and modifications which may be resorted to without sacrificing the utility or departing from the spirit and scope of my invention.

Having thus described my invention, I claim—

1. In a device of the class described, a frame connected pivotally with suitable traction means, a shaft journaled transversely in said frame and having a plurality of cranks radiating from its axis, a crank-shaft likewise journaled in the sides of the frame and having a single crank and a controlling-lever, stirrups mounted pivotally upon said crank, and spading implements connected pivotally with the cranks radiating from the main crank-shaft and having handles connected pivotally with the free ends of the stirrups.

2. In a device of the class described, a frame connected pivotally with suitable traction means, a shaft journaled transversely in said frame and having a plurality of cranks radiating from its axis, a crank-shaft likewise journaled in the sides of the frame and having a single crank and a controlling-lever, stirrups mounted pivotally upon said crank, and spading implements connected pivotally and adjustably with the cranks radiating from the main crank-shaft and having handles connected pivotally with the free ends of the stirrups.

3. In a device of the class described, a carrying-frame, a crank-shaft journaled therein and having a plurality of cranks radiating from its axis, boxes journaled upon said cranks, spading implements connected adjustably with said boxes and yieldable supporting means for the upper ends of the handles of said spading implements.

4. In a device of the class described, a carrying-frame, a crank-shaft journaled therein and having a plurality of cranks radiating from its axis, boxes journaled upon said cranks, spading implements connected adjustably with said boxes, yieldable supporting means for the upper ends of the handles of the spading implements and means for adjusting said yieldable supporting means to regulate the tilt of the spading implements.

In testimony that I claim the foregoing as my own I have hereto affixed my signature in the presence of two witnesses.

JOHN L. PARKER.

Witnesses:
J. N. CADDEL,
W. E. MOUNTAIN.